United States Patent
Dragoi et al.

(10) Patent No.: US 6,791,218 B1
(45) Date of Patent: Sep. 14, 2004

(54) STALL PROTECTION FOR BRUSH MOTORS WITH ROTATION SENSING BRUSH DEVICE

(75) Inventors: Corneliu Dragoi, London (CA); Attila Simofi-Ilyes, London (CA); Andrew Lakerdas, London (CA); Dragan Radakovic, London (CA)

(73) Assignee: Siemens VDO Automotive Inc., Chatham (CA)

( * ) Notice: Subject to any disclaimer, the term of this patent is extended or adjusted under 35 U.S.C. 154(b) by 111 days.

(21) Appl. No.: 10/437,104

(22) Filed: May 13, 2003

Related U.S. Application Data

(60) Provisional application No. 60/455,885, filed on Mar. 20, 2003.

(51) Int. Cl.[7] ............................................... H02K 11/00
(52) U.S. Cl. .................... 310/68 B; 310/68 R; 310/248; 318/138; 318/254
(58) Field of Search ................................ 310/68 B, 179, 310/233, 248, 67 R, 68 R; 318/138, 254, 560, 563, 434, 601, 439

(56) References Cited

U.S. PATENT DOCUMENTS

| | | | | |
|---|---|---|---|---|
| 3,876,919 A | * | 4/1975 | Kearns | 388/819 |
| 4,025,808 A | * | 5/1977 | Grengg et al. | 310/68 B |
| 5,086,243 A | * | 2/1992 | Hofmann | 310/68 B |
| 5,517,067 A | * | 5/1996 | Sata | 310/68 B |
| 5,783,924 A | * | 7/1998 | Kahlman | 318/601 |
| 6,153,993 A | * | 11/2000 | Oomura et al. | 318/434 |
| 6,664,698 B1 | * | 12/2003 | Tasch et al. | 310/239 |

* cited by examiner

Primary Examiner—Thanh Lam

(57) ABSTRACT

A system and method for protecting a motor from a stall condition includes a brush motor 11 having power brushes 14 and 16 that convey power to windings of the motor, and one sensing brush 20 constructed and arranged to sense a speed of rotation of an armature motor. A controller 23 is constructed and arranged to compare a sensed speed of rotation with a minimum speed value that is indicative of a stall condition. A relay 28 is constructed and arranged to disconnect power to the motor if the sensed speed is below the minimum speed value.

16 Claims, 4 Drawing Sheets

STALL PROTECTION FOR BRUSH MOTORS WITH ROTATION SENSING BRUSH DEVICE

This application is base on U.S. Provisional Application No. 60/455,885 filed on Mar. 20, 2003 and claims the benefit thereof for priority purposes.

FIELD OF THE INVENTION

This invention relates to stall protection for protecting brush type motors in the event of stall or partial stall conditions.

BACKGROUND OF THE INVENTION

Partial stall and blocked rotor conditions could occur from snow packing or ice blocking the fan of the engine cooling fan module of a vehicle. Also, foreign objects such as a rag, a stick, or wet leaves could block the fan and could create partially blocked rotor conditions. Furthermore, worn bearing (partially ceased) could create the same failure mode. In the event of stall or partial stall conditions, the electric motor, without protection, would draw high current and this can cause thermal failure of the motor. Thus, there is a need to provide improved stall protection for an electric motor.

SUMMARY OF THE INVENTION

An object of the invention is to fulfill the need referred to above. In accordance with the principles of the present invention, this objective is achieved by a method of protecting a brush motor from a stall condition. The method includes the steps of providing a brush motor having power brushes that convey power to windings of the motor, and one sensing brush constructed and arranged to obtain an AC signal indicative of a speed of rotation of an armature of the motor, with the speed of rotation being proportional to a frequency of the AC signal. The motor is powered and the AC signal is obtained with the sensing brush and the speed of rotation of the armature is determined. The determined speed of rotation of the armature is compared with a minimum speed value that is indicative of a stall condition of the motor. If the determined speed of rotation of the armature is below the minimum speed value, power to the motor is disconnected.

In accordance with another aspect of the invention, a system for protecting a motor from a stall condition includes a brush motor having power brushes that convey power to windings of the motor, and one sensing brush constructed and arranged to obtain an AC signal indicative of a speed of rotation of an armature of the motor, with the speed of rotation being proportional to a frequency of the AC signal. A controller is constructed and arranged to compare a speed of rotation obtained by the sensing brush with a minimum speed value that is indicative of a stall condition of the motor. A relay is constructed and arranged to disconnect power to the motor if the speed of rotation obtained by the sensing brush is below the minimum speed value.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
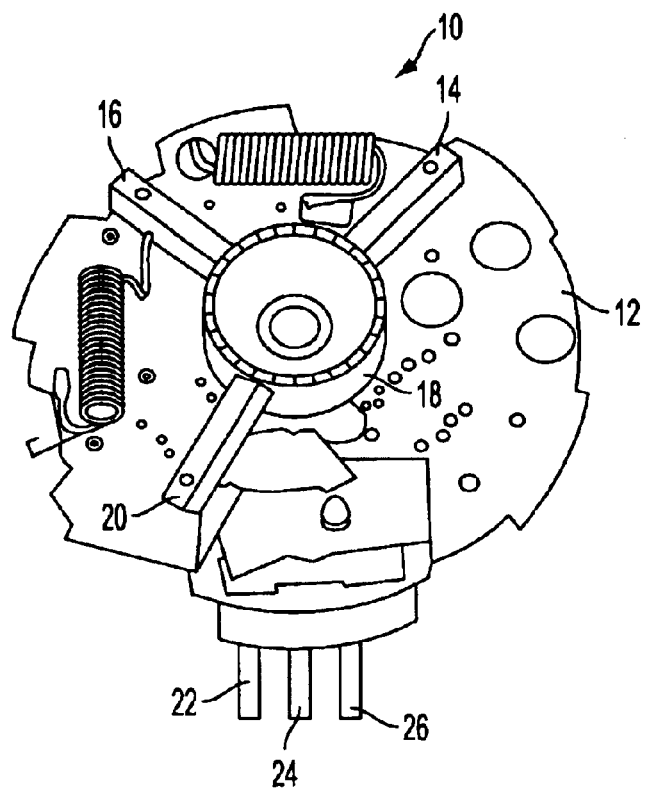
FIG. 1 is front view of a brush card assembly having a third brush for speed sensing in accordance with the invention.

With reference to FIG. 1, a brush card assembly of an electric motor is shown, generally indicated at 10, in accordance with the principles of the invention. The brush card assembly 10 includes a brush card 12, a positive brush 14, a negative brush 16 and a link wound commutator 18. In accordance with the invention, a speed/frequency sensing brush 20 is carried by the brush card 12 as an additional brush. The motor speed is monitored by the speed/frequency sensing brush 20 (as, for example, a third or fifth brush). A battery minus leadwire 22, a battery plus leadwire 24 and a speed/frequency sensing leadwire 26 are provided.

Figure 2:
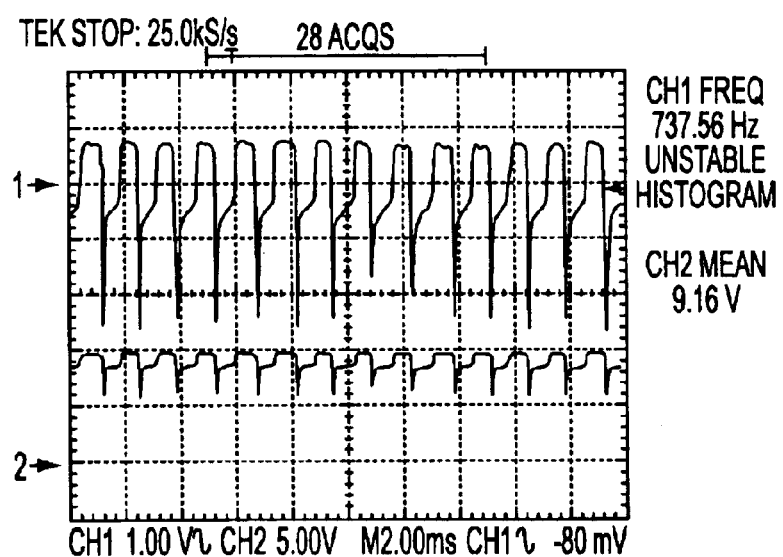
FIG. 2 shows an AC speed signal of a brush motor.

With reference to FIG. 2, the rotation of the motor produces an AC signal that is capacitively connected to an electronic circuit 32. When the power is applied to the motor (and the electronic circuit), a short period of time is allowed for the motor to start and speed up. After that, the AC speed signal from the motor, as obtained by the additional brush 20, is compared, via comparing structure 23, against a predetermined minimum speed setting. Thus, a delay period of time is introduced between the moment when electrical power is applied to the motor; and the moment when the actual motor speed is compared against the minimum speed setting. This minimum speed setting represents a fault condition (meaning stall or partial stall). In the embodiment, the comparing structure 23 is an RPM signal detector as will be explained more fully below. Alternatively, the comparing structure 23 could be a controller.

Figure 3:
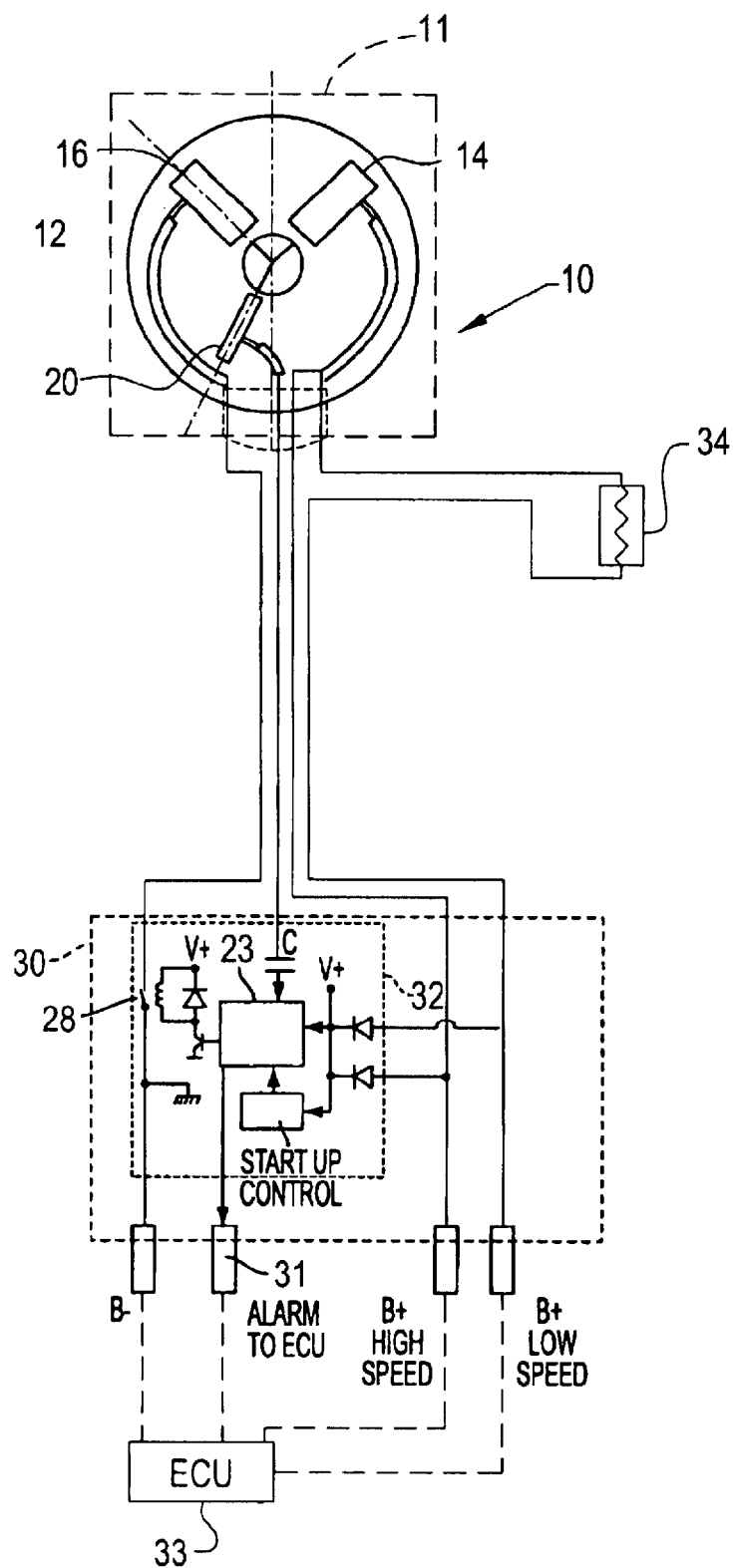
FIG. 3 is a schematic illustration of an embodiment of the invention showing a rotation sensing brush device (RSBD) integrated in a lead wire assembly for two speed application and with an external resistor in series.

FIG. 3 shows an embodiment of the invention with the brush card assembly 10 of FIG. 1 of motor 11 integrated with a lead wire assembly 30 for a two speed application. In the event of the motor speed being below the specified minimum value, a fault condition is identified and the power is disconnected from the motor, by energizing a normally closed relay 28 (FIG. 3). This relay 28 is part of a leadwire assembly 30 including the stall protection circuitry 32. Although a Normally Closed (NC) relay 28 is shown, it can be appreciated that a Normally Open (NO) relay can be used with some minor modifications to the circuit. Also, as shown in FIG. 3, an alarm signal 31 is generated and sent to the ECU (Engine Control Unit) 33 to inform that a fault condition was detected and the power was disconnected from the motor. The system is latched in the fault state (motor being disconnected from power and the alarm signal to ECU active) until the ECU resets the system. FIG. 3 also shows a resistor 34, mounted in an air, for low speed operation of the motor.

The system can be reset if the relay 28 at the vehicle side is de-energized (minimum 3 seconds recommended) and then energized again. If the motor is not subjected to the blocking condition at a second trial (melted snow, for example) then the motor runs normally. If the stall cause is still present, the motor will be de-energized and the alarm signal is sent to the ECU again. The cycle repeats indefinitely. Therefore, a limited number of tentative start-ups are recommended to be programmed in the ECU.

The sensing/frequency brush 20 carries only a small current (in the mA range). The sensing/frequency brush 20 function is only for armature rotation sensing (has no role in power conveying to the motor's windings) and has smaller dimensions and harder material as compared to the regular power brushes 14 and 16.

The speed signal, captured from a motor running at approximately 2200 rpm, is shown in the oscilloscope waveform of FIG. 2. For this 20 bar-motor of the embodiment, the relationship between the motor speed and sensing brush signal frequency is:

Motor Speed [rpm]=Sensed Signal Frequency [Hz]*(60 seconds/minute)/(20 pulses/rotation)

Motor Speed [rpm]=Sensed Signal Frequency [Hz]*3

The operating range of the system is preferably: Temperature: −40° C. to +120° C.

Voltage: 9V to 16V.

Figure 4:
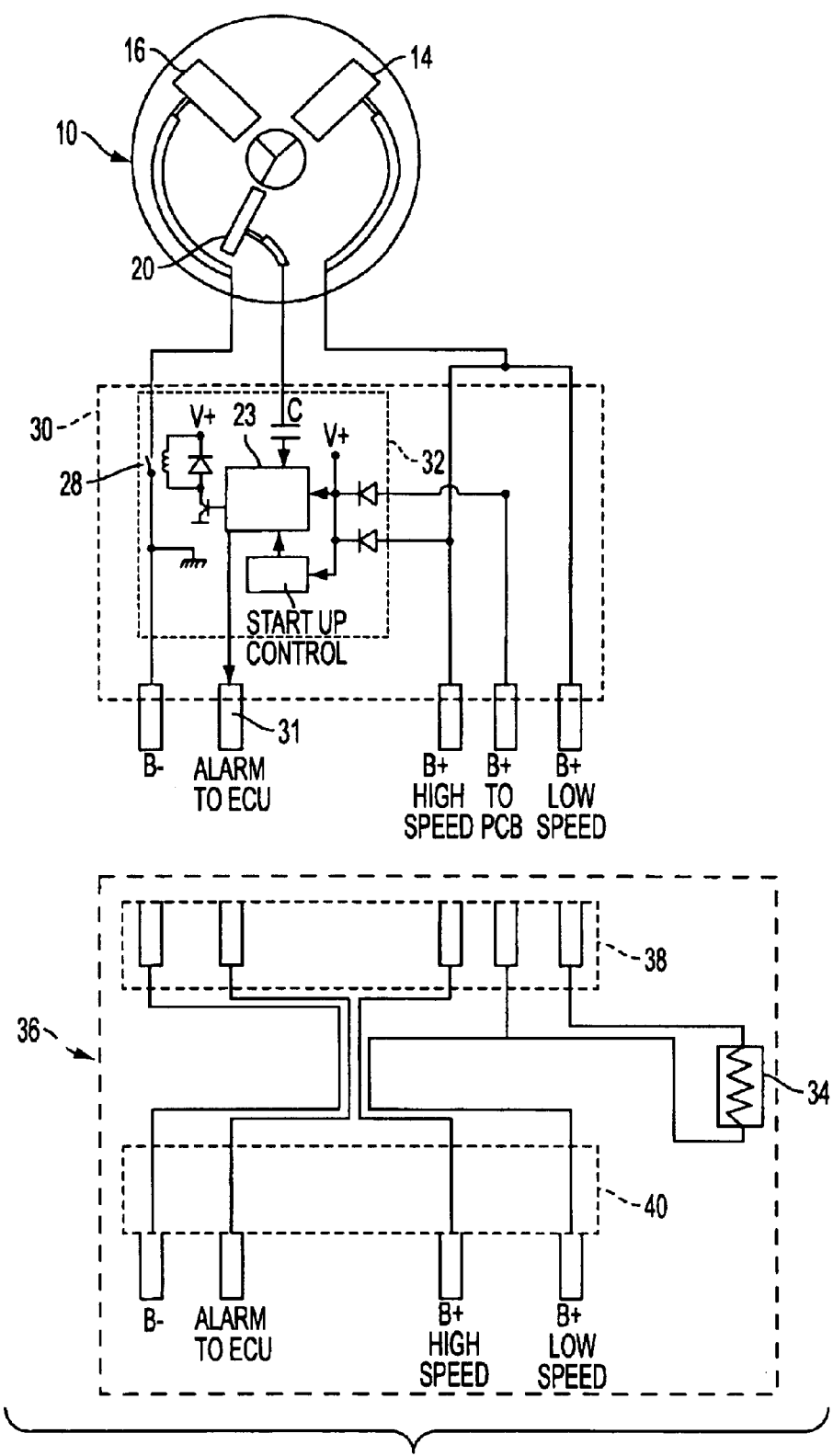
FIG. 4 is a schematic illustration of another embodiment of the invention showing a rotation sensing brush device built into an integral connector for two speed application and with an external resistor in series.

FIG. 4 shows another embodiment of the invention with the brush card assembly 10 being integral with a leadwire assembly 30 that is connectable with a connector assembly, generally indicated at 36. The connector assembly 36 includes a first connector 38 for connecting with the lead wire assembly 30 (motor side) and a second connector 40 for connecting with a vehicle connector (vehicle side). The connector assembly 36 also includes the resistor 34 for low speed operation of the motor.

Figure 5:
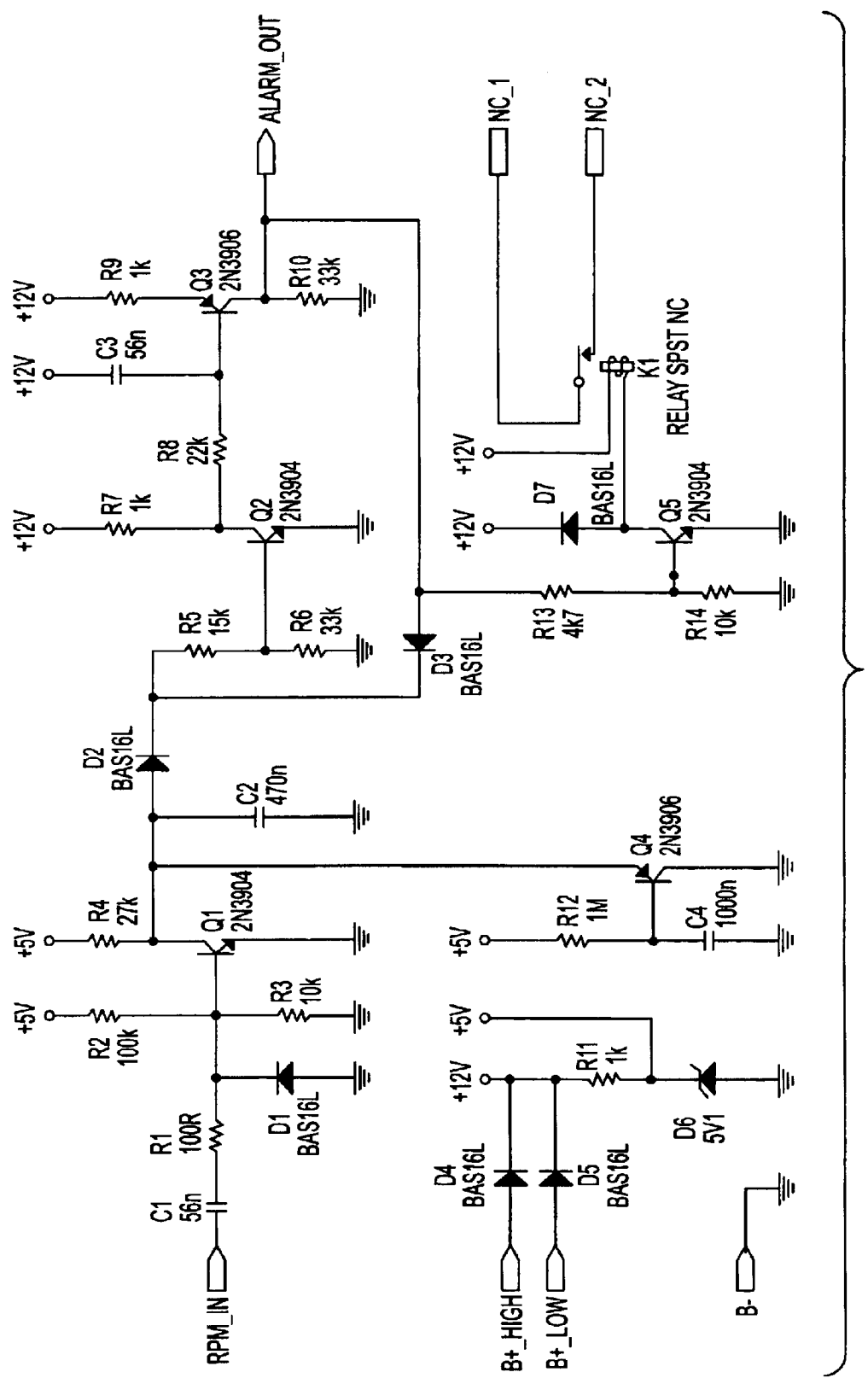
FIG. 5 is a circuit diagram of an embodiment of the invention.

An example of the circuit 32 is shown schematically in FIG. 5 and includes the following main features:

RPM Signal Detector (Comparing Structure 23)

Detects when the input signal frequency from sensing brush 20 (proportional with motor speed) is below a minimum threshold i.e. a stall condition recognized.

Capacitors: C1, C22
Resistors: R1, R2, R3, R4
Diodes: D1, D2
Transistors: Q1

Latch Block

Once a stall condition was recognized, this block will latch into a state where the electromagnetic relay's coil is de-energized and the alarm signal is activated. The latch is re-set at power-off.

Capacitors: C3
Resistors: R5, R6, R7, R8, R9, R10
Diodes: D3
Transistors: Q2, Q3

Relay Driver

Energizes the relay coil at normal operation and/or de-energizes the relay coil at stall condition.

Resistors: R13, R14
Diodes: D7
Transistors: Q5

Start-up Control

Inhibits the RPM Signal Detector for short time (approx. 1 sec) at power-up in order to allow the motor to accelerate from zero to operational speed.

Capacitors: C4
Resistors: R12
Transistors: Q4

Electronic Power Supply

Provides regulated power for the entire circuitry.

Resistors: R11
Diodes: D4, D5
Zener Diodes: D6
Note: D4, D5 are used for dual speed motor applications.

Electromagnetic Relay K1

Connects the motor to the power supply (car's battery).

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of protecting a brush motor from a stall condition, the method including the steps of:

providing a brush motor having power brushes that convey power to windings of the motor, and one sensing brush constructed and arranged to obtain an AC signal indicative of a speed of rotation of an armature of the motor, with the speed of rotation being proportional to a frequency of the AC signal, powering the motor, obtaining the AC signal with the sensing brush and determining the speed of rotation of the armature, comparing the determined speed of rotation of the armature with a minimum speed value that is indicative of a stall condition of the motor, and disconnecting power to the motor if the determined speed of rotation of the armature is below the minimum speed value.

2. The method of claim 1, wherein the step of disconnecting power to the motor includes activating a relay.

3. The method of claim 1, wherein the minimum speed value indicates at least a partial stall condition of the motor.

4. The method of claim 1, further including, after powering the motor, establishing a time delay period sufficient to permit the motor to generate speed, prior to executing the comparing step.

5. The method of claim 1, further including generating an alarm signal to indicate that a stall condition is present while the power remains disconnected from the motor.

6. The method of claim 5, further including receiving the alarm signal at an engine control unit, and resetting the relay, via the engine control unit, once the stall condition is no longer present.

7. A system for protecting a motor from a stall condition comprising:

a brush motor having power brushes that convey power to windings of the motor, and one sensing brush constructed and arranged to obtain an AC signal indicative of a speed of rotation of an armature of the motor, with the speed of rotation being proportional to a frequency of the AC signal, means for comparing a speed of rotation obtained by the sensing brush with a minimum speed value that is indicative of a stall condition of the motor, and means for disconnecting power to the motor if the speed of rotation obtained by the sensing brush is below the minimum speed value.

8. The system of claim 7, wherein the means for disconnecting power to the motor is a relay.

9. A system for protecting a motor from a stall condition comprising:

a brush motor having power brushes that convey power to windings of the motor, and one sensing brush constructed and arranged to obtain an AC signal indicative of a speed of rotation of an armature of the motor, with the speed of rotation being proportional to a frequency of the AC signal, comparing structure constructed and arranged to compare a speed of rotation obtained by the sensing brush with a minimum speed value that is indicative of a stall condition of the motor, and a relay constructed and arranged to disconnect power to the motor if the speed of rotation obtained by the sensing brush is below the minimum speed value.

10. The system of claim 9, wherein the comparing structure and relay are integrated into a lead wire assembly that includes positive and negative power leads.

11. The system of claim 10, further including a connector assembly having a first connector constructed and arranged to connect with the lead wire assembly and a second connector constructed and arranged to connect with a vehicle connector.

12. The system of claim 11, wherein the connector assembly includes a resistor constructed and arranged to be employed for low speed operation of the motor.

13. The system of claim 9, further including alarm generating structure constructed and arranged to generate an alarm signal wherein a stall condition occurs.

14. The system of claim 13, further including an engine control unit constructed and arranged to receive the alarm signal and to reset the relay.

15. The system of claim 9, wherein the sensing brush is of dimensions smaller than the dimensions of each power brush.

16. The system of claim 9, wherein the comparing structure includes a transistor.

* * * * *